United States Patent
Johnson et al.

(10) Patent No.: US 10,834,866 B2
(45) Date of Patent: *Nov. 17, 2020

(54) EXHAUST WEBBING FOR AN AGRICULTURAL IMPLEMENT TANK

(71) Applicant: CNH Industrial America LLC, New Holland, PA (US)

(72) Inventors: Chad M. Johnson, Arlington Heights, IL (US); Scott A. Long, Plainfield, IL (US); Joshua J. Roszman, Shorewood, IL (US); Marvin A. Prickel, Homer Glen, IL (US); Grant T. MacDonald, Ames, IA (US); Michael J. Connors, Lockport, IL (US)

(73) Assignee: CNH Industrial America LLC, New Holland, PA (US)

( * ) Notice: Subject to any disclaimer, the term of this patent is extended or adjusted under 35 U.S.C. 154(b) by 187 days.

This patent is subject to a terminal disclaimer.

(21) Appl. No.: 16/047,705

(22) Filed: Jul. 27, 2018

(65) Prior Publication Data

US 2018/0332763 A1    Nov. 22, 2018

Related U.S. Application Data

(63) Continuation of application No. 14/942,804, filed on Nov. 16, 2015, now Pat. No. 10,051,780, which is a continuation of application No. 13/737,893, filed on Jan. 9, 2013, now Pat. No. 9,185,842.

(51) Int. Cl.
*A01C 7/08* (2006.01)
*A01C 15/00* (2006.01)

(52) U.S. Cl.
CPC .............. *A01C 7/084* (2013.01); *A01C 7/081* (2013.01); *A01C 15/006* (2013.01)

(58) Field of Classification Search
CPC ........... A01C 7/084; A01C 7/081; A01C 7/08; A01C 7/00; A01C 15/006; A01C 15/005; A01C 15/00
See application file for complete search history.

(56) References Cited

U.S. PATENT DOCUMENTS

| | | | |
|---|---|---|---|
| 5,324,143 A | 6/1994 | Sanders | |
| 5,379,706 A | 1/1995 | Gage et al. | |
| 5,979,343 A | 11/1999 | Gregor et al. | |
| 6,668,738 B2 | 12/2003 | Lee et al. | |
| 6,675,728 B2 | 1/2004 | Lee et al. | |
| 6,782,835 B2 | 8/2004 | Lee et al. | |
| 8,001,913 B2 | 8/2011 | Snipes et al. | |
| 9,185,842 B2 | 11/2015 | Johnson | |
| 10,051,780 B2 * | 8/2018 | Johnson | A01C 7/081 |
| 2011/0247956 A1 | 10/2011 | Crager et al. | |

* cited by examiner

*Primary Examiner* — Christopher J. Novosad
(74) *Attorney, Agent, or Firm* — Rebecca L. Henkel; Rickard K. DeMille

(57) ABSTRACT

A seed tank assembly for an agricultural implement including an exhaust opening configured to exhaust seeds from the seed tank assembly, in which at least one webbing extends across the exhaust opening forming a plurality of apertures, the at least one webbing is integrally molded into the seed tank assembly, and the at least one webbing is configured to provide structural support to the seed tank assembly and to reduce seed head pressure into an inductor box positioned beneath the exhaust opening.

12 Claims, 4 Drawing Sheets

EXHAUST WEBBING FOR AN AGRICULTURAL IMPLEMENT TANK

CROSS-REFERENCE TO RELATED APPLICATION

This application is a continuation of U.S. patent application Ser. No. 14/942,804, entitled "EXHAUST WEBBING FOR AN AGRICULTURAL IMPLEMENT TANK" and filed Nov. 16, 2015, which is a continuation of U.S. patent application Ser. No. 13/737,893, entitled "EXHAUST WEBBING FOR AN AGRICULTURAL IMPLEMENT TANK" filed Jan. 9, 2013, each of which is incorporated herein by reference in its entirety for all purposes.

BACKGROUND

The invention relates generally to ground working equipment, such as agricultural equipment, and more specifically, to exhaust webbing for an agricultural implement tank.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit seeds at a desired depth beneath the soil surface, thereby establishing rows of planted seeds. For example, each row unit may include a ground engaging tool or opener (e.g., an opener disc) that forms a seeding path for seed deposition into the soil. In certain configurations, a gauge wheel is positioned a vertical distance above the opener to establish a desired trench depth for seed deposition into the soil. As the implement travels across a field, the opener excavates a trench into the soil, and seeds are deposited into the trench. In certain row units, the opener is followed by a packer wheel that packs the soil on top of the deposited seeds.

Certain planting implements include a central seed tank, and a pneumatic distribution system configured to convey seeds from the tank to each row unit. For example, the pneumatic distribution system may include an inductor box positioned beneath the seed tank. The inductor box is configured to receive seeds from the tank, to fluidize the seeds into an air/seed mixture, and to distribute the air/seed mixture to the row units via a network of pneumatic hoses/conduits. Each row unit, in turn, receives the seeds from the pneumatic hoses/conduits, and directs the seeds to a metering system. The metering system is configured to provide a flow of seeds to a seed tube for deposition into the soil. By operating the metering system at a particular speed, a desired seed spacing may be established as the implement traverses a field.

The central seed tank may exhaust the seeds from the seed tank to the inductor box through an exhaust opening. As the seeds are exhausted, the weight of the seeds may apply an undesirably large pressure on the inductor box, thereby reducing the efficiency of the air/seed fluidization process. In addition, a large exhaust opening may reduce the structural rigidity of the tank, thereby increasing the difficulty of implement manufacturing process.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a seed tank assembly for an agricultural implement includes an exhaust opening configured to exhaust seeds from the seed tank assembly, in which at least one webbing extends across the exhaust opening forming a plurality of apertures, the at least one webbing is integrally molded into the seed tank assembly, and the at least one webbing is configured to provide structural support to the seed tank assembly and to reduce seed head pressure into an inductor box positioned beneath the exhaust opening.

In a second embodiment, an agricultural implement includes a seed tank assembly for the agricultural implement. The seed tank assembly includes an exhaust opening configured to exhaust seeds from the seed tank assembly, in which at least one webbing extends across the exhaust opening forming a plurality of apertures, and the at least one webbing is integrally molded into the seed tank assembly. The agricultural implement further includes an inductor box coupled to the seed tank assembly and configured to receive seeds from the seed tank assembly. The at least one webbing is configured to provide structural support to the seed tank assembly and to reduce seed head pressure into the inductor box.

In a third embodiment, an agricultural implement includes a seed tank assembly for the agricultural implement. The seed tank assembly includes an exhaust opening configured to exhaust seeds from the seed tank assembly, in which at least one webbing extends across the exhaust opening forming a plurality of apertures, and the at least one webbing is integrally molded into the seed tank assembly. The agricultural implement further includes a pneumatic distribution system coupled to the seed tank assembly configured to pneumatically distribute seeds throughout the agricultural implement. The at least one webbing is configured to provide structural support to the seed tank assembly and to reduce seed head pressure into an inductor box of the pneumatic distribution system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Various embodiments of the present disclosure include a central seed tank for a planting implement. The seed tank may be used to supply a planting implement with 24 rows, for example. Thus the seed tank may be of substantial size (e.g., about 3 feet tall and 6 feet across and hold approximately 3.5 tons of seeds). Seeds in the seed tank are exhausted from the seed tank through an exhaust opening. The seed tank may is also configured to interface with a pneumatic distribution system, and specifically an inductor box. An undesirably large pressure may be placed on the inductor box due to the weight of the seeds in the seed tank, which may reduce the efficiency of the pneumatic distribution system.

Accordingly, one disclosed embodiment provides a seed tank assembly configured to store seeds for an agricultural implement. The seed tank assembly includes an exhaust opening configured to exhaust seeds from the seed tank assembly, and at least one webbing extending across the exhaust opening forming at least two apertures. The webbing is integrally molded into the seed tank assembly. In addition, the webbing is configured to provide structural support to the seed tank assembly and to reduce seed head pressure in an inductor box positioned beneath the exhaust opening. The additional structural support provided by the webbing increases the rigidity of the tank, thereby facilitating the implement assembly process. In addition, the reduced head pressure provided by the webbing may enhance the efficiency of the inductor box by providing a desired flow of seed and/or increase the longevity of the inductor box.

Figure 1:
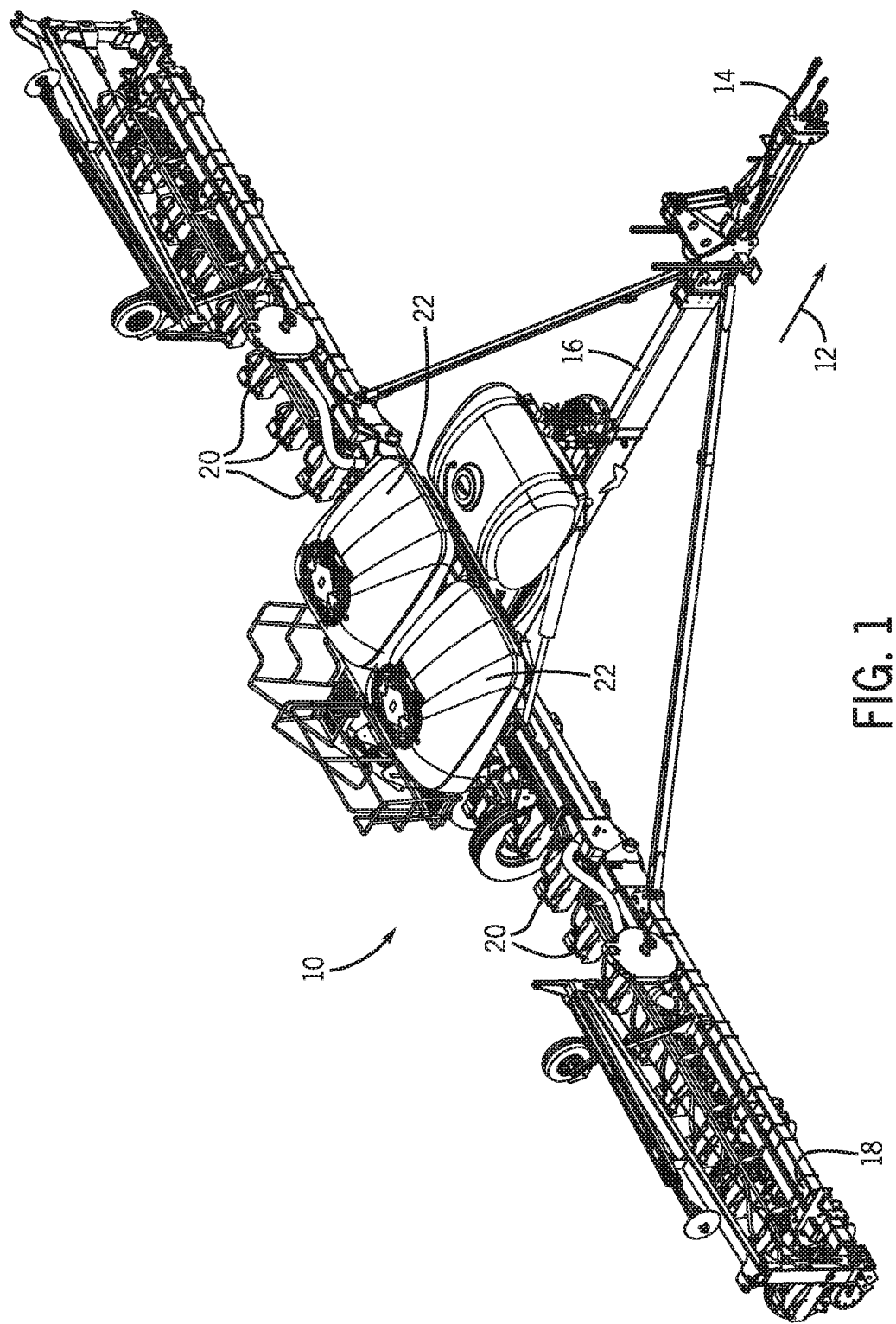
FIG. 1 is a perspective view of an embodiment of an agricultural implement configured to deposit seeds into a soil surface.

FIG. 1 is a perspective view of an embodiment of an agricultural implement 10 configured to deposit seeds into a soil surface. In the illustrated embodiment, the implement 10 is configured to be towed along a direction of travel 12 by a work vehicle, such as a tractor or other prime mover. The work vehicle may be coupled to the implement 10 by a hitch assembly 14. As illustrated, the hitch assembly 14 is coupled to a main frame assembly 16 of the implement 10 to facilitate towing of the implement 10 in the direction of travel 12. In the illustrated embodiment, the frame assembly 16 is coupled to a tool bar 18 that supports multiple row units 20. Each row unit 20 is configured to deposit seeds at a desired depth beneath the soil surface, thereby establishing rows of planted seeds. The implement 10 also includes seed tanks 22, and a pneumatic distribution system configured to convey seeds from the tanks to the row units 20. In certain embodiments, the pneumatic distribution system includes an inductor box positioned beneath each seed tank 22. Each inductor box is configured to receive seeds from a respective tank, to fluidize the seeds into an air/seed mixture, and to distribute the air/seed mixture to the row units 20 via a network of pneumatic hoses/conduits.

In certain embodiments, each row unit 20 includes a residue manager, an opening assembly, a seed tube, closing discs, and a press wheel. The residue manager includes a rotating wheel having multiple tillage points or fingers that break up crop residue, thereby preparing the soil for seed deposition. The opening assembly includes a gauge wheel and an opener disc. The gauge wheel may be positioned a vertical distance above the opener disc to establish a desired trench depth for seed deposition into the soil. As the row unit travels across a field, the opener disc excavates a trench into the soil for seed deposition. The seed tube, which may be positioned behind the opening assembly, directs a seed from a metering system into the excavated trench. The closing discs then direct the excavated soil into the trench to cover the planted seed. Finally, the press wheel packs the soil on top of the seed with a desired pressure.

While the illustrated implement 10 includes 24 row units 20, it should be appreciated that alternative implements may include more or fewer row units 20. For example, certain implements 10 may include 6, 8, 12, 16, 24, 32, or 36 row units, or more. In addition, the spacing between row units may be particularly selected based on the type of crop being planting. For example, the row units may be spaced 30 inches from one another for planting corn, and 15 inches from one another for planting soy beans.

Figure 2:
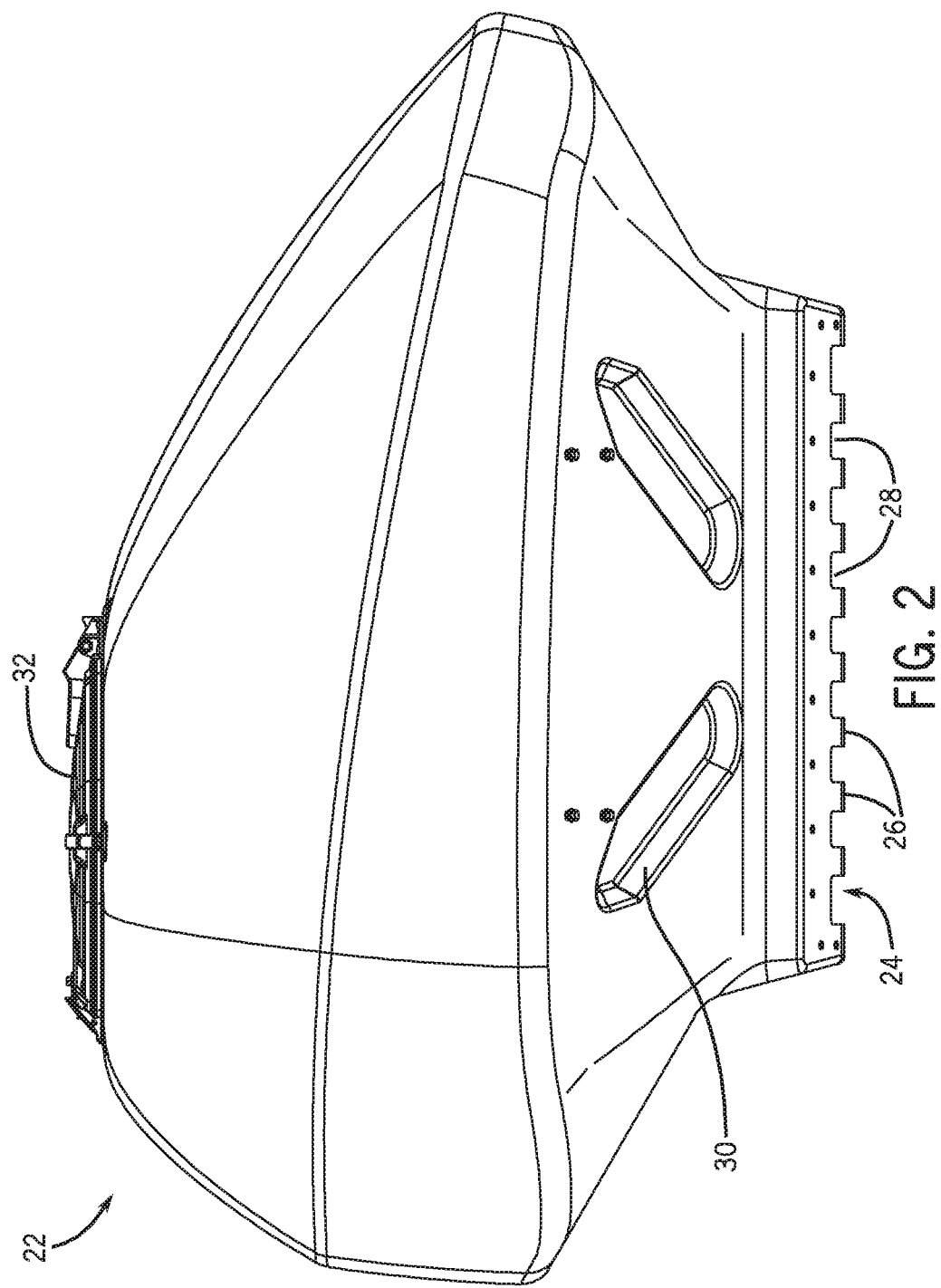
FIG. 2 is a side view of an embodiment of a seed tank, showing an exhaust opening and a webbing across the exhaust opening.

FIG. 2 is a side view of an embodiment of a seed tank 22, showing an exhaust opening 24 and a webbing 26 across the exhaust opening 24. As described above, the seed tank 22 may be configured to store seeds for the agricultural implement 10. For example, the seed tank 22 may be about 3 feet tall, about 6 feet wide, and configured to store about 3.5 tons of seeds. The seed tank 22 may be molded from a single piece of polyethylene (e.g. via a rotational molding process). However, it should be appreciated that the seed tank body 22 may be molded from other types of thermoplastics or thermosets, such as polypropylene, polystyrene, polyvinyl chloride, or polytetrafluoroethylene.

In addition, the seed tank 22 includes an exhaust opening 24 configured to exhaust seeds from the seed tank 22. In the depicted embodiment, the exhaust opening 24 is rectangular with a webbing 26 that extends across the exhaust opening 24 to form apertures 28. The rectangular shape of the exhaust opening 24 facilitates interfacing with the pneumatic distribution system, and in some embodiments, the inductor box. The webbing 26 across the exhaust opening 24 may be configured to provide structural support to the seed tank 22. In some embodiments, the webbing 26 may be about 20 mm to about 30 mm, about 30 mm to about 40 mm, or about 40 mm to about 50 mm. Because the seed tank 22 may be formed from a resilient material such as polyethylene and the exhaust opening 24 may be of substantial size, the seed tank 22, especially the exhaust opening 24, may deform during handling, thereby increasing the difficulty associated with the manufacturing process. In the illustrated embodiment, the webbing 26, which extends across the exhaust opening 24, provides additional structural support to the seed tank 22, thereby substantially reducing deformation of the tank, and facilitating the manufacturing process.

The depicted seed tank 22 also includes molded ribs 30 configured to provide additional structural rigidity to the seed tank 22, and a tank lid 32 configured to facilitate filling the seed tank 22 with seeds. The exhaust opening 24 is configured to interface with a pneumatic distribution system, and specifically an inductor box.

Figure 3:
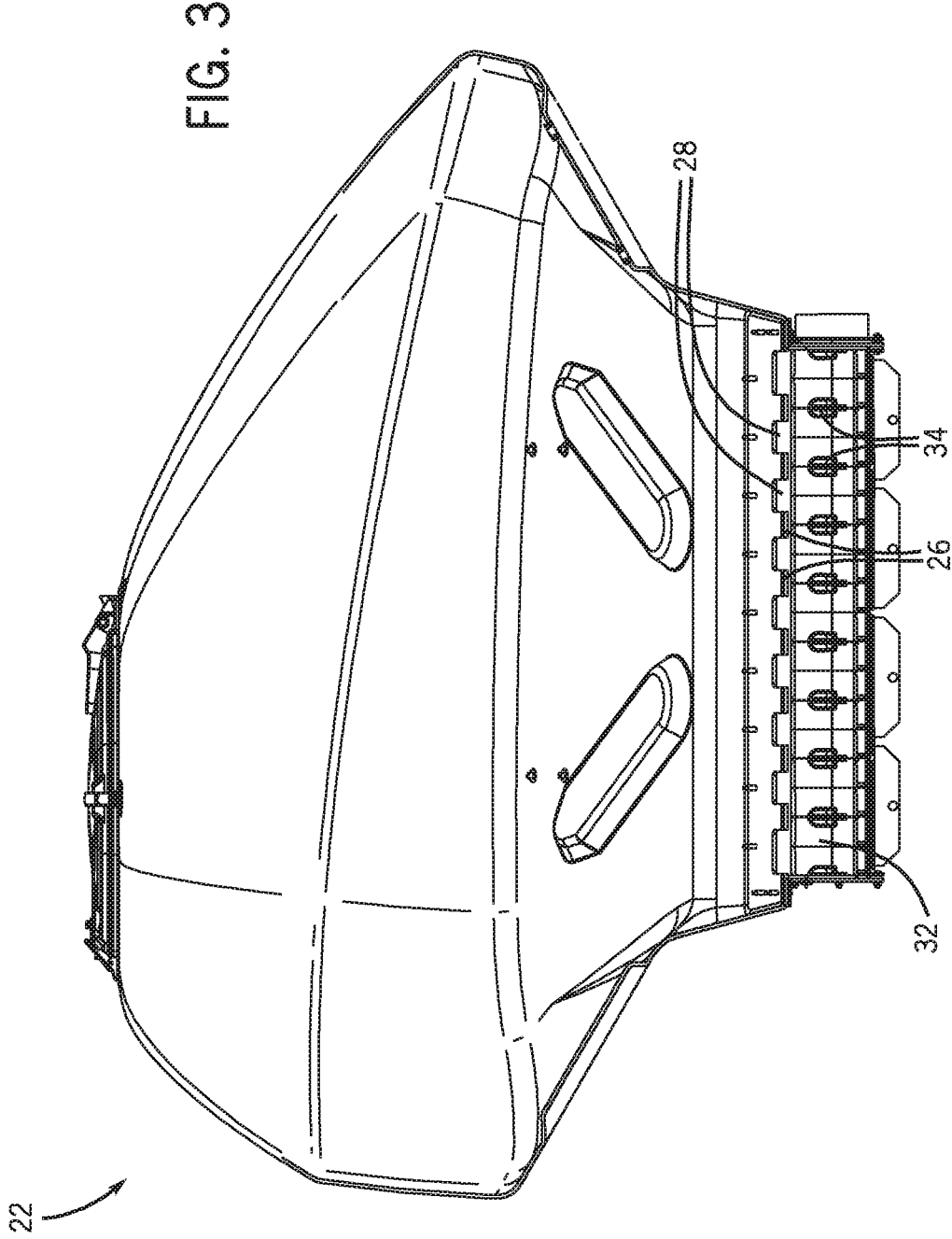
FIG. 3 is a side cross-sectional view of the seed tank of FIG. 2, showing the seed tank interfacing with an inductor box.

FIG. 3 is a side cross-sectional view of the seed tank of FIG. 2, showing the seed tank interfacing with the inductor box 32. The webbing 26 is configured to reduce seed head pressure to the inductor box 32 by restricting the flow of seeds. As previously discussed, seeds flow from the seed tank 22 to the inductor box 32 via the apertures 28, which collectively have a smaller surface area than an unrestricted exhaust opening 24. The smaller flow area reduces seed head pressure on the inductor box 32, thereby increasing the longevity of the inductor box components. As described above, the inductor box 32 may be coupled to the bottom of the seed tank 22 along the exhaust opening 24. The inductor box 32 is configured to receive seeds from the seed tank 22 in order to pneumatically distribute the seeds to the row units 20. As depicted, the exhaust opening 24 interfaces with the rectangular inductor box 32. Because the flow of seeds is restricted by the webbing 26, the inductor box 32 may distribute seeds more efficiently than an inductor box 32 that receives seeds from an unrestricted exhaust opening 24.

In addition, the depicted inductor box 32 includes air bypass channels 34. If the exhaust opening 24 is one continuous opening, seeds may rest directly on the air bypass channels 34. As described above, the weight of the seeds in the seed tank 22 may be substantial (e.g., about 3.5 tons when full). Accordingly, the seeds may pack on the channels 34, thereby causing plugging and/or bridging, and interfering with the flow of seeds into the inductor box 32. In the illustrated embodiment, the webbing 26 is configured to guide the flow through the apertures 28 and around the air bypass channels 26. For example, in the depicted embodiment, each web is located directly above a respective air bypass channels 34. Accordingly, as the seeds are exhausted from the seed tank 22 through the apertures 28, gravity carries the majority of the seeds straight down, thereby avoiding the air bypass channels 26. Thus, the webbing 26 may facilitate the flow of seeds from the seed tank 22 to the inductor box 32 by reducing the plugging and/or bridging that may otherwise occur. The distance between the air bypass channels 34 and each web may be selected to adjust the amount of seeds that pass between the air bypass channels 26.

Figure 4:
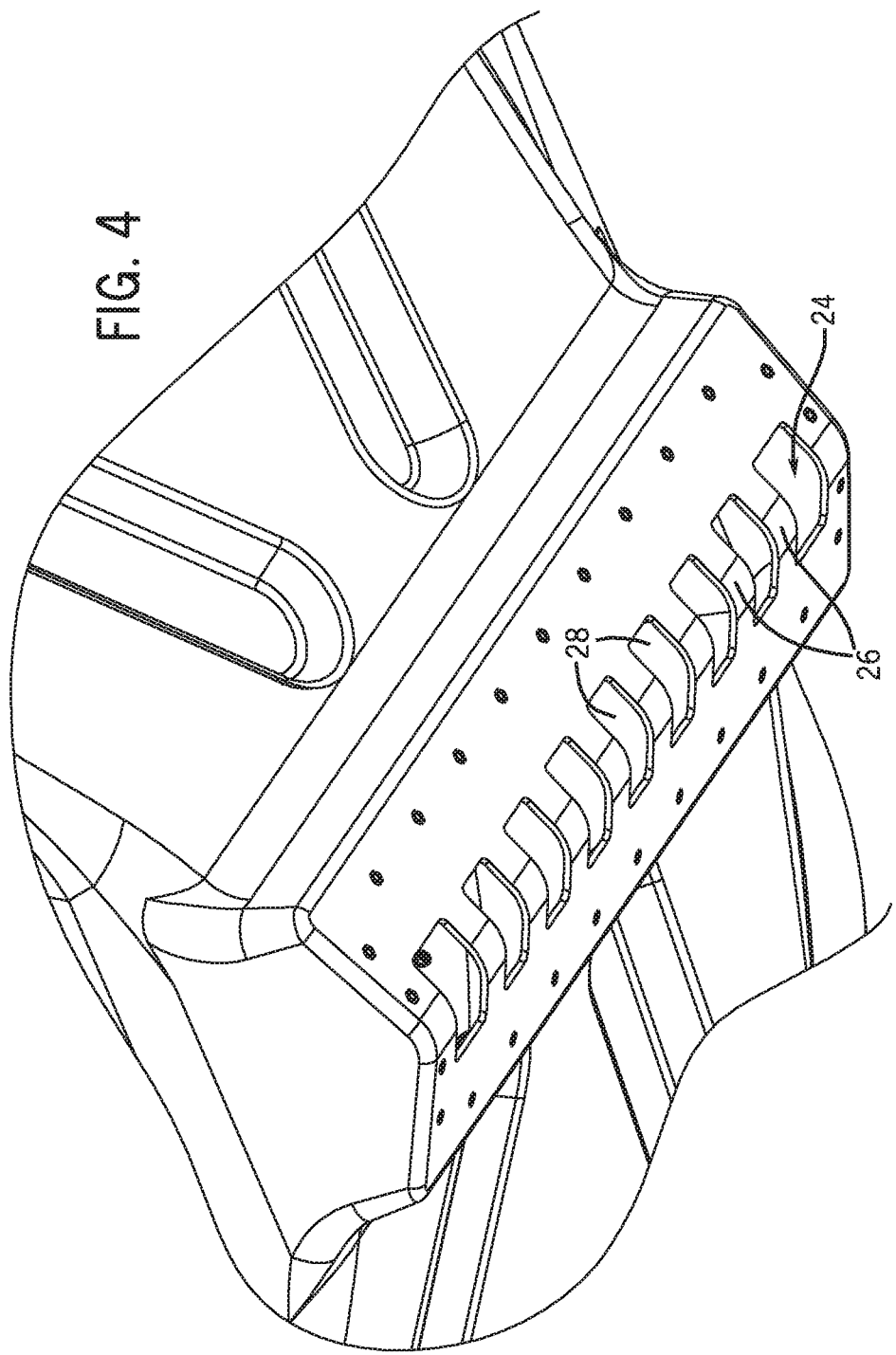
FIG. 4 is a bottom perspective view of the seed tank of FIG. 2, showing the exhaust opening and webbing.

FIG. 4 is a bottom perspective view of the seed tank of FIG. 2, showing the exhaust opening 24 and webbing 26. In the depicted embodiment, the webbing 26 is incorporated into the seed tank 22. In other words, the webbing 26 is integrally molded into the seed tank 22. Accordingly, the webbing 26 described herein may reduce the part count of the tank assembly, as compared to tanks having a separate grate. With a reduction in hardware components, the assembly complexity may also be reduced. In certain embodiments, each web may be cut into the seed tank 22 during manufacturing.

In addition, each depicted web is curved. In addition, the seed tank 22 may be better suited to reduce plugging and bridging of seeds because of the ability of the webbing 26 to agitate the seeds. The resilient nature of the seed tank 22 and the curved shape of the webbing 26 may facilitate agitation of seeds as the air pressure varies within the seed tank 22. As described above, the pneumatic distribution system, including the inductor box 32, may be configured to pneumatically distribute seeds throughout the agricultural implement 10. Accordingly, the pneumatic distribution system may be configured to circulate air through the seed tank 22. As the air circulates, it may cause the seed tank 22 to flex outwardly due to the added internal pressure from the circulating air. When the seed tank 22 flexes outwardly, it may cause the curved webs to flatten. The movement of the webs may agitate the seeds in the seed tank 22, thereby reducing seed packing and dislodging any plugging or bridging. In some embodiments, each web may move 1 mm to dislodge the seeds. In other embodiments, each web may be configures to move between about 0.5 mm to about 1 mm, about 1 mm to about 3 mm, about 3 mm to about 5 mm, or greater than 5 mm. Thus, the webbing 26 may act as a natural agitator to reduce plugging and bridging across the exhaust opening 24.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of implementing an agricultural implement, comprising:
   forming a seed tank assembly configured to exhaust seeds through an exhaust opening of the seed tank assembly, wherein at least one webbing extends across the exhaust opening to form a plurality of apertures, and the at least one webbing is integrally molded into the seed tank assembly; and
   coupling a pneumatic distribution system to the seed tank assembly, wherein the pneumatic distribution system is configured to pneumatically distribute seeds from the seed tank assembly;
   wherein the at least one webbing is configured to:
      provide structural support to the seed tank assembly; and
      reduce seed head pressure exerted on the pneumatic distribution system by flexing to dislodge seeds on the at least one webbing in response to pressurization of the seed tank assembly.

2. The method of claim 1, wherein the at least one webbing extends over an air bypass channel of the agricultural implement.

3. The method of claim 1, wherein flexing of the at least one webbing comprises transitioning from a curved configuration to a flattened configuration in response to pressurization of the seed tank assembly.

4. The method of claim 1, wherein the pneumatic distribution system comprises an inductor box coupled to the seed tank assembly.

5. The method of claim 4, wherein the inductor box is configured to:
   receive seeds from the seed tank assembly; and
   distribute the seeds to one or more row units of the agricultural implement via pneumatic hoses.

6. The method of claim 1, wherein the pneumatic distribution system is coupled below the seed tank assembly.

7. The method of claim 1, wherein the exhaust opening is formed on a downward facing surface of a bottom portion of the seed tank assembly.

8. The method of claim 1, wherein the plurality of apertures are substantially rectangular.

9. A pneumatic distribution system comprising:
   an inductor box configured to:
      receive seeds exhausted by a seed tank assembly coupled directly above the inductor box; and
      pneumatically distribute the seeds to one or more row units of an agricultural implement,
   wherein the inductor box comprises a plurality of air bypass channels configured to guide airflow through the pneumatic distribution system, wherein a plurality of webbings integrally molded into the seed tank assembly is positioned directly above the plurality of air bypass channels forming a plurality of apertures between the plurality of webbings, wherein the plurality of webbings are configured to:
guide the seeds around the air bypass channels;
provide structural support to the seed tank assembly;
reduce seed head pressure into the inductor box; and
flex to dislodge seeds on the plurality of webbings in response to pressurization of the seed tank assembly.

10. The pneumatic distribution system of claim 9, wherein the inductor box receives seeds exhausted by the seed tank assembly through the plurality of apertures via gravity.

11. The pneumatic distribution system of claim 9, wherein the pneumatic distribution system is configured to circulate air through the seed tank assembly causing the plurality of webbings to flex.

12. The pneumatic distribution system of claim 9, wherein the plurality of webbings flex by transitioning between a curved configuration and a flattened configuration.

\* \* \* \* \*